US006829385B2

United States Patent
Nakase

(10) Patent No.: US 6,829,385 B2
(45) Date of Patent: Dec. 7, 2004

(54) APPARATUS AND METHOD FOR PROCESSING IMAGES, AND A COMPUTER-READABLE MEDIUM

(75) Inventor: Shiro Nakase, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 636 days.

(21) Appl. No.: 09/941,656

(22) Filed: Aug. 30, 2001

(65) Prior Publication Data

US 2002/0041706 A1 Apr. 11, 2002

(30) Foreign Application Priority Data

Sep. 1, 2000 (JP) ........................................ 2000-265413

(51) Int. Cl.[7] ................................................. G06K 9/36
(52) U.S. Cl. ...................... 382/166; 382/167; 382/240; 382/250; 382/251; 382/248; 382/260; 358/539; 358/512; 358/474; 375/240.2; 375/240.21
(58) Field of Search ................................. 382/162, 165, 382/166, 167, 164, 232, 239, 299, 243, 250, 251, 240, 263, 264, 260, 265, 274, 276, 279, 300, 262, 233, 246, 248; 358/539, 445, 474, 512, 519, 520, 521, 525, 518; 375/240.03, 240.04, 240.19, 240.2, 240.21, 240.23, 245; 348/650

(56) References Cited

U.S. PATENT DOCUMENTS 6,687,296 B1 * 2/2004 Sato et al. .............. 375/240.12
2003/0067979 A1 * 4/2003 Takahashi et al. ...... 375/240.03

FOREIGN PATENT DOCUMENTS

JP          2001-086345          3/2001

* cited by examiner

Primary Examiner—Bhavesh M. Mehta
Assistant Examiner—Ali Bayat
(74) Attorney, Agent, or Firm—Finnegan, Henderson, Farabow, Garrett & Dunner, L.L.P.

(57) ABSTRACT

An image processing apparatus which performs color transformation and compression/decompression simultaneously on image data so that the number of blocks to be transformed with the color transformation can be reduced and the processing speed can be improved without spoiling the apparent image quality.

26 Claims, 12 Drawing Sheets

APPARATUS AND METHOD FOR PROCESSING IMAGES, AND A COMPUTER-READABLE MEDIUM

CROSS-REFERENCE TO RELATED APPLICATIONS

This application claims the benefit of Japanese Patent Application No. 2000-265413, filed on Sep. 1, 2000; the contents of which are expressly incorporated herein by reference in their entirety.

DESCRIPTION OF THE INVENTION

Field of the Invention

The invention relates to an apparatus and method for processing images. More particularly, the invention relates to an apparatus and method for executing image compression or decompression and for executing color transformation on image data in accordance with physical characteristics dependent upon a particular image input/output device. Further, the invention relates to a computer-readable medium containing instructions for performing such a method for executing image compression or decompression and for executing color transformation on image data.

Generally, each of various color image input/output devices, for example, color scanners, color digital cameras, color printers, or color displays has different physical characteristics dependent upon the device itself. Consequently, there is a need for each image input/output device to execute color correction on inputted signal values constituting image data, such as RGB (Red, Green and Blue) values, depending upon its physical characteristics, and then output the signal values after executing the color correction. For example, each image input/output device may add a tinge of red to skin color to make a ruddy complexion, in accordance with the inputted image data characteristic. Each correction is referred to as color transformation.

Because color transformation using a simple linear transformation is insufficient to obtain high quality images, a color transformation table and a multi-dimensional numerical formula are generally used. However, in such cases, transformation requires very long times to perform. Methods of color transformation are roughly divided into three classes: using a numerical formula; using a transformation table (i.e., look up table (LUT)); and using both a numerical formula and LUT.

Color transformation using a numerical formula

The following numerical formula (1) may be used as the simplest example of the numerical formula:

$$\begin{bmatrix} R' \\ G' \\ B' \end{bmatrix} = \begin{bmatrix} a_{rr} & a_{rg} & a_{rb} \\ a_{gr} & a_{gg} & a_{gb} \\ a_{br} & a_{bg} & a_{bb} \end{bmatrix} \begin{bmatrix} R \\ G \\ B \end{bmatrix} \quad (1)$$

That is, corrected gradients (i.e., R', G', and B') are obtained by multiplying gradients (i.e., R, G, and B), which are the three primary colors (Red, Green, and Blue) in each pixel constituting the original image, by transformation coefficients $a_{mn}$. In such a case, the numerical formula (1) requires multiplication nine times. Further, it is necessary to apply this calculation to all pieces of the pixels. Therefore, if there are N pieces of a pixel, it is necessary to execute the multiplication 9N times.

Although it is necessary to execute higher-dimension transformation to meet actual needs for color transformation for all the points of a color space, high-dimension transformation requires a large number of calculations. For example, even when a secondary item is introduced, it is necessary to execute the multiplication 27 times per pixel as shown by the following numerical formula (2).

$$\begin{bmatrix} R' \\ G' \\ B' \end{bmatrix} = [(3 \times 9 \text{ array})] \begin{bmatrix} R \\ G \\ B \\ R^2 \\ G^2 \\ B^2 \\ RG \\ GB \\ BR \end{bmatrix} \quad (2)$$

However, there are many cases where the numerical formula (2) is inadequate. Therefore, it is rare to execute color transformation using only the numerical formula.

Color transformation using a LUT

With this method, a table defining a corresponding color for each color is referenced. As a result, the time required for transformation can be remarkably shortened compared with a transformation using the numerical formula. However, the size of the table becomes very large for transformation over a large color space. For instance, a 24-bit color space requires a table of $2^{24} \times 24$ bits, namely, 48 M Bytes.

Color transformation using both a numerical formula and a LUT

With this method, a table defining a corresponding color for each of the representative colors, predetermined in a color space, is referenced and colors corresponding to each of the other colors are calculated, using a numerical formula, with several of these representative colors within the neighborhood of each color. For example, in a RGB color space where each original color has 256 tones, colors positioned at a cross point defined by dividing the 256 tones into 16 portions may be the representative colors. According to this method, a large table size is not necessary and a color space area to be interpolated using a relatively simple numerical formula can be reduced. Further, the numerical formula is not complicated.

This method is often employed and there are various applied methods regarding how to divide the color space, how to choose the representative colors, and how to interpolate the color space area. This method, however, also requires multiplications and divisions several times for each pixel, and does not eliminate the disadvantage of requiring a large amount of calculations. Therefore, a faster method is desirable.

In recent years, a data compression system, such as JPEG, has been widely utilized to reduce the size of data to be processed. JPEG is a compression system for multiple tone images including color images and has been standardized by the International Standards Organization (ISO) and the International Telecommunication Union (ITU). Data compression generally comprises: frequency transformation→quantization→encoding. And data decompression generally comprises: decoding→inverse quantization→inverse frequency transformation. The quantization and the inverse quantization can be omitted.

Color transformation and image compression techniques are used sequentially as follows in applications.

Input: inputted image→(color transformation)→original image→(compression)→compressed image Output: compressed image→(decompression)→original image→(color transformation)→outputted image For example, a color scanner may execute color transformation on an inputted image, compress the executed image according to JPEG, and output the compressed image to a host computer. A color printer may decompress the compressed data, execute color transformation, and print it out.

However, when color transformation and compression/decompression are sequentially executed according to conventional methods, it is required to execute color transformation on image data having a large amount of picture elements, which may be performed before compression or after decompression. For this reason, even if any of the color transformation methods described above are adopted, a long period of time is required for processing.

SUMMARY OF THE INVENTION

In accordance with an embodiment of the present invention, there is provided an image processing apparatus. The apparatus comprises a first means for performing frequency transformation on image data to generate first frequency components, means for dividing the first frequency components into low-frequency components and high-frequency components, means for performing an inverse transformation of the frequency transformation on the low-frequency components, means for performing color transformation on the low-frequency components that were transformed by the inverse transformation, second means for performing on the low-frequency components that were transformed by the color transformation, a frequency transformation that is the same as the frequency transformation performed by the first means, and means for combining to generate second frequency components, the high-frequency components and the low-frequency components that were transformed by the transformation by the second performing means.

Further, in accordance with an embodiment of the present invention, there is provided an image processing apparatus. The apparatus comprises means for dividing first frequency components into low-frequency components and high-frequency components, first means for performing an inverse frequency transformation on the low-frequency components, means for performing a color transformation on the low-frequency components that were transformed by the inverse frequency transformation, means for performing on the low-frequency components that were transformed by the color transformation a normal transformation of the inverse frequency transformation, means for combining to generate second frequency components the high-frequency components and the low-frequency components that were transformed by the normal transformation, and second means for performing an inverse transformation that is the same as the inverse transformation performed by the first means.

Further in accordance with an embodiment of the present invention, there is provided an image processing method. The method comprises performing a first frequency transformation, an image data to generate first frequency components, dividing the first frequency components into low-frequency components and high-frequency components, performing an inverse transformation of the frequency transformation on the low-frequency components, performing a color transformation on the low-frequency components that were transformed by the inverse transformation, performing a second frequency transformation that is the same as the first frequency transformation on the low-frequency components that were transformed by the color transformation, and combining to generate second frequency components the high-frequency components and the low-frequency components that were transformed by the second frequency transformation.

Also in accordance with an embodiment of the present invention, there is provided an image processing method. The method comprises dividing first frequency components into low-frequency components and high-frequency components, performing a first inverse frequency transformation on the low-frequency components, performing a color transformation on the low-frequency components that were transformed by the inverse frequency transformation, performing a normal transformation of the inverse frequency transformation on the low-frequency components that were transformed by the color transformation, combining to generate second frequency components the high-frequency components and the low-frequency components that were transformed by the normal transformation, and performing a second inverse frequency transformation that is the same as the first inverse frequency transformation.

Further in accordance with an embodiment of the present invention, there is provided a computer-readable medium containing instructions for controlling a data processing system to perform a method for producing a document having a link to a link destination via a network. The method comprises performing a first frequency transformation on image data to generate first frequency components, dividing the first frequency components into low-frequency components and high-frequency components, performing an inverse transformation of the frequency transformation on the low-frequency components, performing a color transformation on the low-frequency components that were transformed by the inverse transformation, performing a second frequency transformation that is the same as the first frequency transformation on the low-frequency components that were transformed by the color transformation, and combining to generate second frequency components the high-frequency components and the low-frequency components that were transformed by the second frequency transformation.

Additionally in accordance with an embodiment of the present invention, there is provided a computer-readable medium containing instructions for controlling a data processing system to perform a method for producing a document having a link to a link destination via a network. The method comprises dividing first frequency components into low-frequency components and high-frequency components, performing a first inverse frequency transformation on the low-frequency components, performing a color transformation on the low-frequency components that were transformed by the inverse frequency transformation, performing a normal transformation of the inverse frequency transformation on the low-frequency components that were transformed by the color transformation, combining to generate second frequency components the high-frequency components and the low-frequency components that were transformed by the normal transformation and performing a second inverse frequency transformation that is the same as the first frequency transformation.

BRIEF DESCRIPTION OF THE DRAWINGS

The accompanying drawings, which are incorporated in and constitute part of this specification, illustrate various embodiments and/or features of the invention and together with the description, serve to explain the principles of the invention. In the drawings.

DETAILED DESCRIPTION

Figure 2:
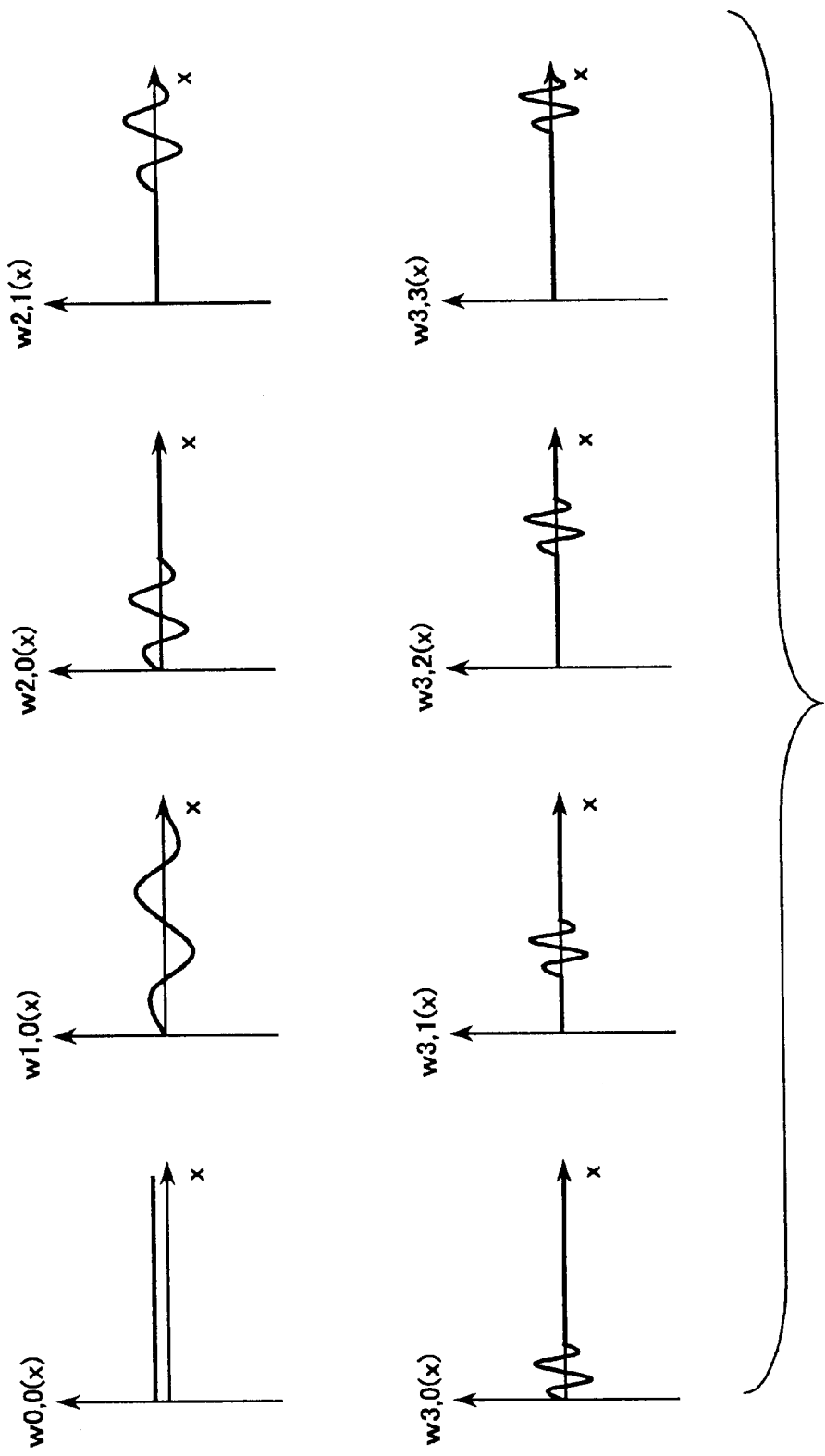
FIG. 2 is a diagram showing base functions of a Wavelet transformation applied to one-dimensional 8 bit pixels.
Figure 3:
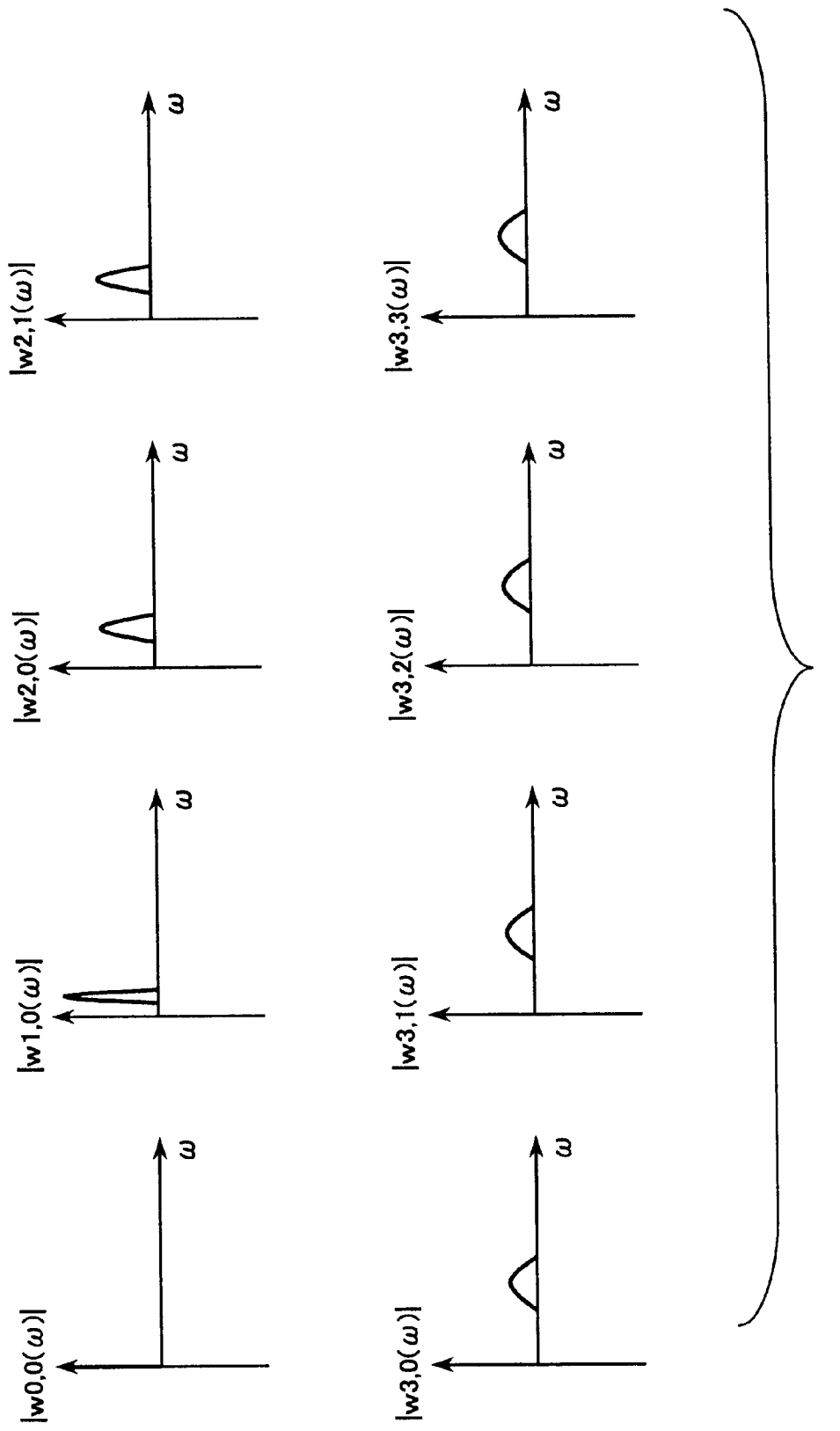
FIG. 3 is a diagram showing base frequency spectrums of Wavelet transformation applied to one-dimensional 8 bit pixels.

First, referring to FIGS. 1 through 3, the principle of image compression/decompression by frequency transformation employing an orthogonal transformation in each image processing apparatus consistent with embodiments of the present invention will now be explained. The orthogonal transformation transforms image data in a spacial coordinate system to a frequency coordinate system, for example. Orthogonal transformation is a generic name for a variety of transformation systems, such as discrete cosine transformation (DCT) or Wavelet transformation.

In general, coordinate transformation from a spatial coordinate system to a frequency coordinate system is called frequency transformation, while coordinate transformation from a frequency coordinate system to a spatial coordinate system is called inverse frequency transformation. In the following, there are cases where an inverse frequency transformation is simply called 'inverse transformation' to corresponding frequency transformation, while frequency transformation is simply called 'normal transformation' to a corresponding inverse frequency transformation.

Figure 1:
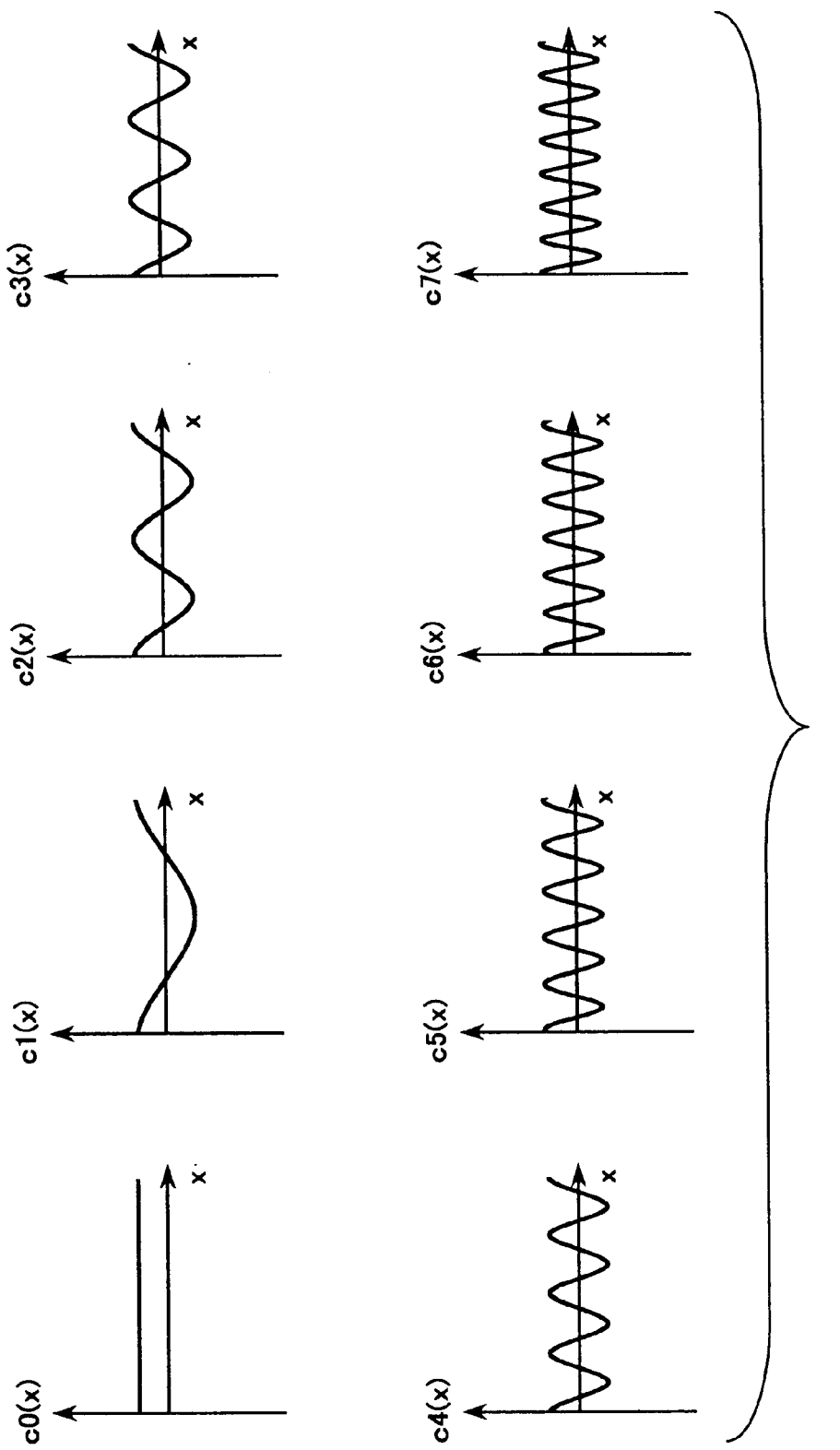
FIG. 1 is a diagram showing examples of base functions of a discrete cosine transformation (DCT) to be applied to one-dimensional 8 bit pixels.

FIG. 1 is a diagram showing examples of base functions $cn(x)$ of a DCT, which are applied to one-dimensional 8 bit pixels. By the DCT, the original image, which is an aggregation of coordinate values in a color space, is transformed to an aggregation of frequency coordinate values so that the degree of color changing can be shown. That is, the original image is decomposed into low-frequency components indicating a slow color change and high-frequency components indicating a rapid color change, and they are expressed as the aggregation of DCT coefficient values to be multiplied to each frequency components. In FIG. 1, a function $c0(x)$ is a base function indicating the slowest color change. Color changes more rapidly one after another from the function $c0(x)$ toward a function $c7(x)$, which is a base function indicating the most rapid rate of change.

The following two points are reasons for the use of frequency transformation for image compression.

(a) When an orthogonal transformation is performed on a natural image, large DCT coefficients appear in the low-frequency components and most DCT coefficients corresponding to high-frequency components approach zero. Therefore, these series of zeros are coded according to a run length method to achieve high-compression effect.

(b) Humans can hardly notice missing high-frequency components because of their visual characteristics. Accordingly, no practical problems occur even if high-frequency components are quantized in order to reduce the amount of information. Additionally, because this quantization converges all values close to zero to zero, the effect described in (a) can be further advantageous.

Although not supported by the current JPEG process, adoption of a Wavelet transformation in place of the DCT has been examined. FIG. 2 is a diagram showing base functions $wm, n(x)$ of the Wavelet transformation applied to one-dimensional 8 pixels. FIG. 3 is a diagram showing base frequency spectrums $|wn.m(\omega)|$ of the Wavelet transformation applied to one-dimensional 8 bit pixels. In the Wavelet transformation, base functions, which are composed of their own scaling and shift, are employed in place of the sine wave functions used by the DCT as shown in FIGS. 2 and 3. Localization of the functions is better in terms of space and frequency. In the base functions $wm, n(x)$, 'm' stands for a frequency and 'n' for a shift value.

Figure 4:
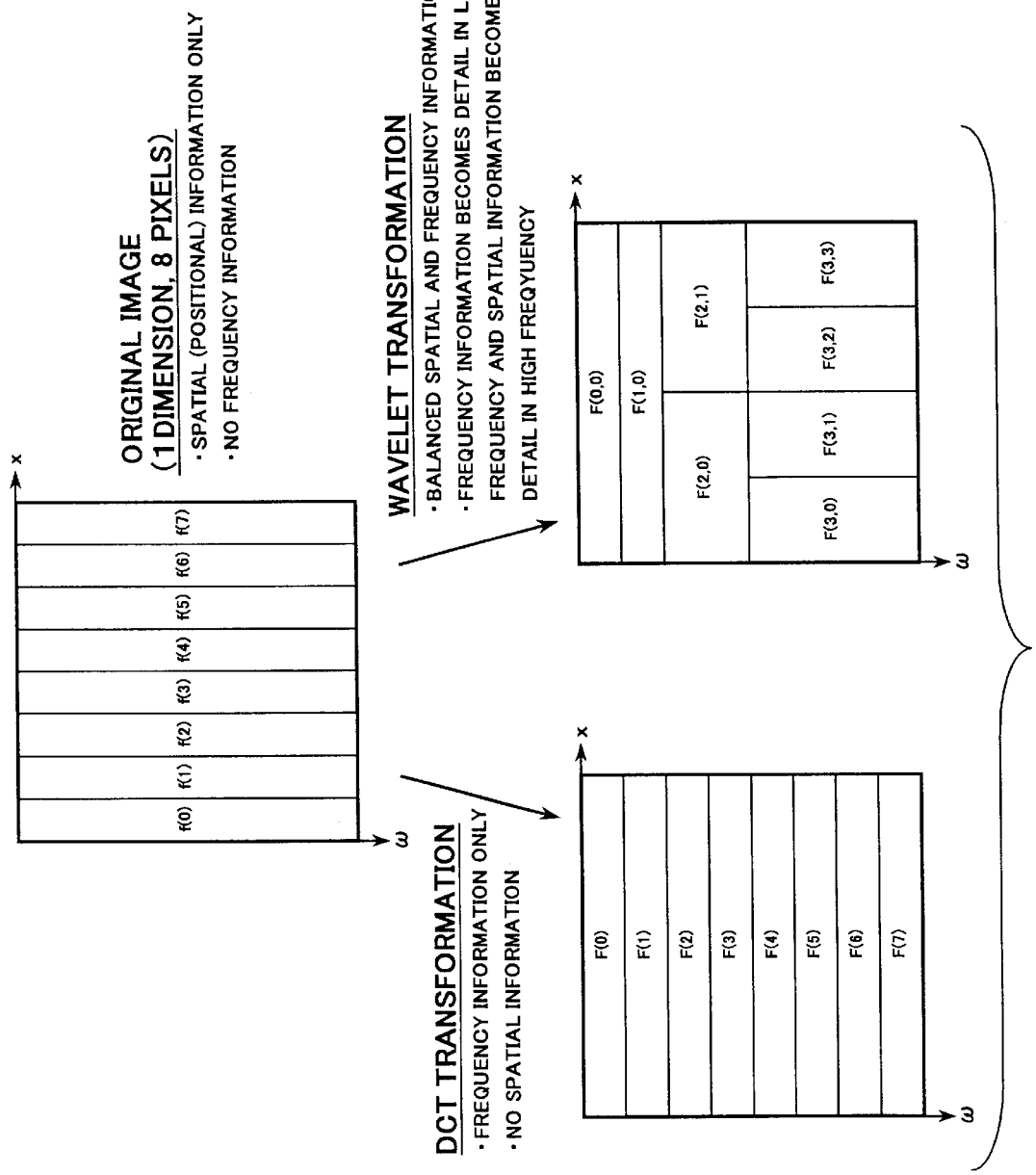
FIG. 4 is a diagram showing resolutions of frequency information and spatial information of DCT and Wavelet transformations.

FIG. 4 is a diagram showing resolutions of frequency information and spatial (or positional) information of the DCT and Wavelet transformation. As shown in FIG. 4, coefficient values of the DCT contain only frequency components, while coefficient values of the Wavelet transformation contain much frequency information on low-frequency components and much color space coordinate information on high-frequency components. For this reason, if Wavelet transformation is employed, the compression rate can be improved. Additionally, even though the number of target pixels increases, the calculation quantity for the transformation does not increase compared with the DCT. Also, it is not always required to specifically divide blocks.

Next, embodiments of the present invention will be explained.

First Embodiment

Figure 5:
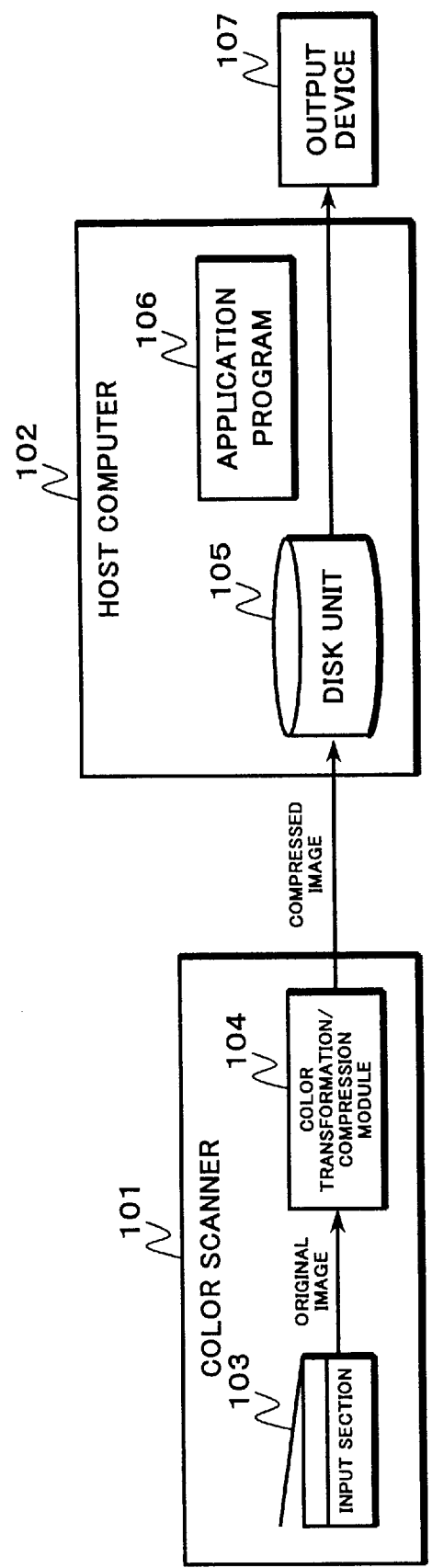
FIG. 5 is a block diagram showing an example of a main configuration of an image processing apparatus consistent with a first embodiment of the present invention.

FIG. 5 is a block diagram showing an example of a main configuration of an image processing apparatus consistent with a first embodiment of the present invention. In FIG. 5, a color scanner system comprises a color scanner 101 and a host computer 102. Color scanner 101 has an input section 103 and a color transformation/compression module 104. Input section 103 reads a color image and supplies it to a color transformation/compression module 104 as original image data. Color transformation/compression module 104 executes both color transformation and compression on this original image data.

With color transformation, color correction, depending on the characteristic of color scanner 101, color transformation to conform an image to a user's taste, or color transformation for color space transformation between RGB and CMY (cyan, magenta and yellow) may be executed. The image data may be compressed according to JPEG standard in the compression. After color transformation/compression module 104 performs processing, the original image data is transferred as a compressed image to host computer 102 through a storage medium or a communication medium.

Host computer 102 has a disk unit 105 and an application program 106. Disk unit 105 stores the compressed image supplied from color transformation/compression module 104, following a command by application program 106. An output device, such as a display or printer, outputs the compressed data. Alternately, color transformation/compression module 104 may be installed in host computer 102.

Figure 6:
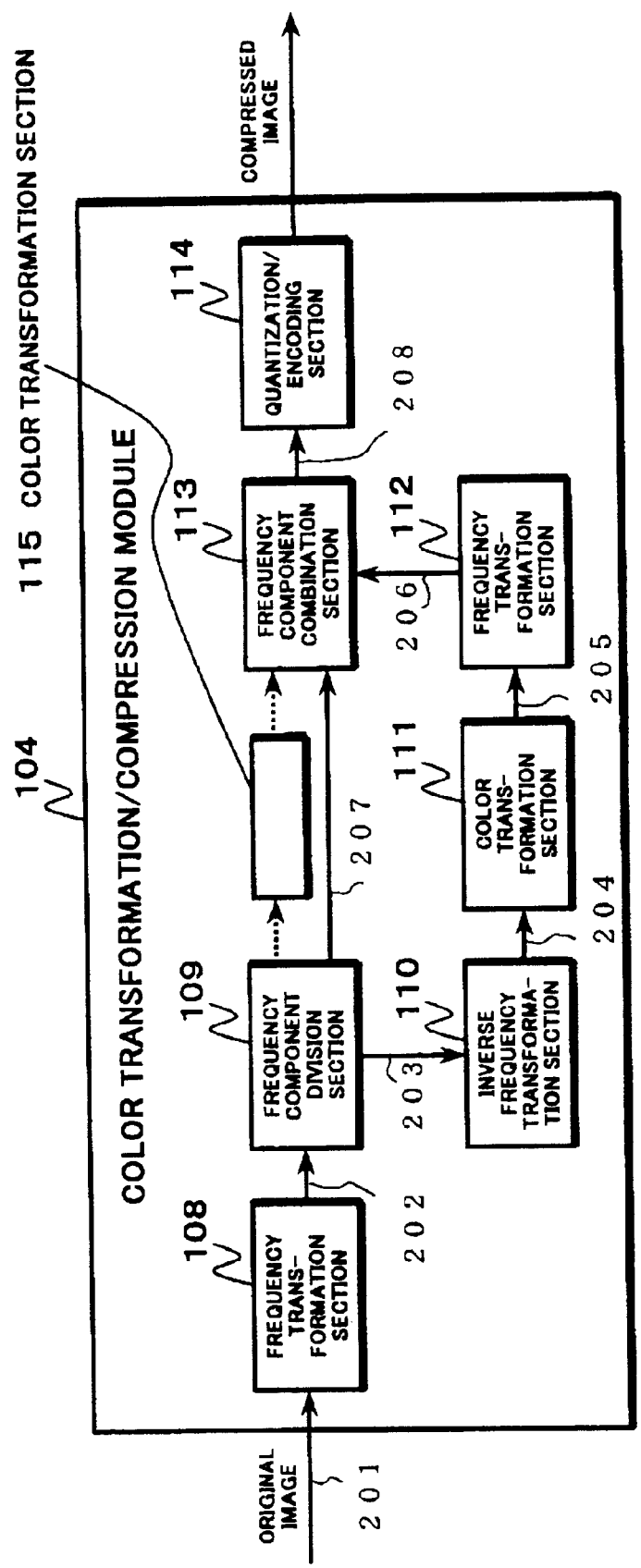
FIG. 6 is a block diagram showing an example of a main configuration of a color transformation/compression module of the image processing apparatus shown in FIG. 5.
Figure 7:
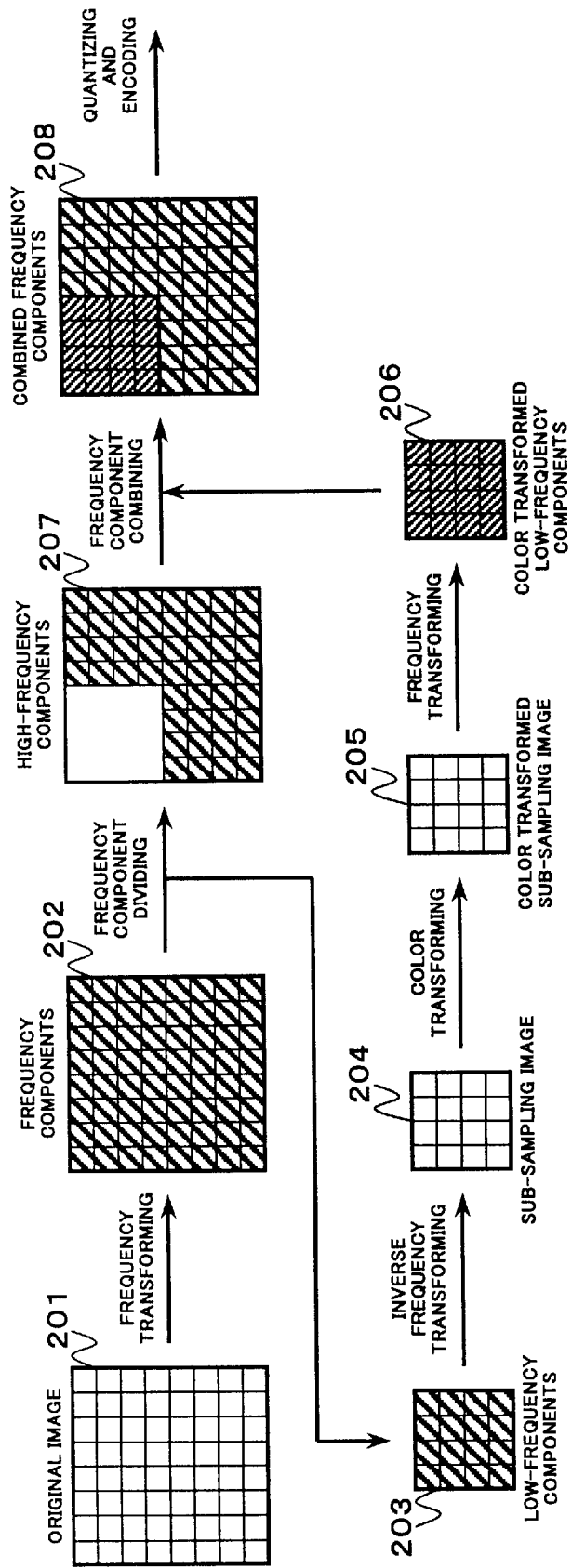
FIG. 7 is a diagram showing a procedure for executing color transformation/compression by the module shown in FIG. 6.

Next, referring to FIGS. 6 and 7, the color transformation/compression processing method will be explained. FIG. 6 is a block diagram showing an example of a main configuration of a color transformation/compression module 104 of the image processing apparatus shown in FIG. 5. FIG. 7 is a diagram showing a procedure for executing color transformation/compression by the module shown in FIG. 6.

Color transformation/compression module 104 has a frequency transformation section 108, a frequency component division section 109, an inverse frequency transformation section 110, a color transformation section 111, a frequency transformation section 112, a frequency component combination section 113, and a quantization/encoding section 114. After executing the frequency transformation on the original image data and dividing it into high-frequency components and low-frequency components, color transformation/compression module 104 executes color transformation.

Frequency transformation section 108 executes the frequency transformation according to a DCT of an original image 201, which is supplied from input section 103 and is, for example, composed of a block of 8×8 bit pixels. As a result, frequency transformation section 108 obtains frequency components (DCT coefficients) 202.

Frequency component division section 109 recognizes a size of each block of the frequency components 202, depending on desired image quality and processing speed. Frequency component division section 109 divides frequency components 202 and outputs low-frequency components 203 composed of blocks of 4×4 bit pixels, for example, to inverse frequency transformation section 110. Frequency component division section 109 outputs high-frequency components 207, which are different than the blocks of 4×4 bit pixels, to frequency component combination section 113.

Inverse frequency transformation section 110 generates a reduced image, which has a smaller number of pixels compared with original image 201, by executing the inverse transformation of the frequency transformation, performed by frequency transformation section 108, on the low-frequency components supplied from frequency component division section 109. This reduced image has a block configuration similar to low-frequency components 203 and is equal to the original image executed with sub-sampling after being applied to an ideal low-pass filter (LPF). Therefore, the reduced image is called a sub-sampled image hereinafter.

Color transformation section 111 performs a relatively sophisticated color transformation, namely a high calculation quantity, to sub-sampled image 204, and obtains a color transformed sub-sampled image 205. Because the number of pixels (4×4 bit blocks) to be processed with color transformation is smaller compared with the original image 201 (8×8 bit blocks), it can be processed at higher speed. Frequency transformation section 112 performs on color frequency sub-sampled image 205, the same transformation that frequency transformation section 108 performs. Frequency transformation section 112 generates color transformed low-frequency components 206 and outputs then the frequency component combination section 113.

Frequency component combination section 113 generates a combined frequency component 208 (8×8 bit blocks) by combining high-frequency components 207 supplied from frequency component division section 109 and color transformed low-frequency components 206 supplied from frequency transformation section 112. Quantization/encoding section 114 performs quantization and variable length encoding to combined frequency components 208 and generates a compressed image. The compressed image is then outputted to the host computer 102.

In this embodiment, color transformation on high-frequency component 207 is not performed. However, color transformation section 115 may be installed between frequency component division section 109 and frequency component combination section 113. Color transformation requiring a calculation quantity smaller compared with that performed by the color transformation section 115 may be performed as the need arises. In such cases, it is possible to perform high quality image processing as the need arises. Further, by adjusting the color transformation levels of both color transformation means, appropriate processing depending on desired image quality or speed can be realized.

The above procedure has explained the case of frequency transformation by DCT techniques. However, even when a Wavelet transformation is employed in the frequency transformation, it can be processed by a similar procedure although there is an exception in that the form of the block is different. In the case of the DCT, the sub-sampled image without image deterioration can be obtained. While in the case of the Wavelet transformation, slight image deterioration is partially produced. However, this image deterioration is not at a level to cause a practical problem.

According to this embodiment of the present invention, which takes into account human visual characteristics, the number of pixels in the input of the color transformation can be reduced because the color transformation is performed only on the low-frequency components, with effects to image quality, after the original image is divided into low-frequency components and high-frequency components by frequency transformation. Further, as a result, the LPF function and the sub-sampling function for the original image can be simultaneously realized. So it is possible to speed up the color transformation/compression without spoiling the apparent image quality.

Besides, according to this embodiment, because sub-sampling by curtailing partial data is not performed, there is no need to perform expansion processing after color transformation. So there is no need to determine the boundary position between the low-frequency and high-frequency components.

Second Embodiment

Figure 8:
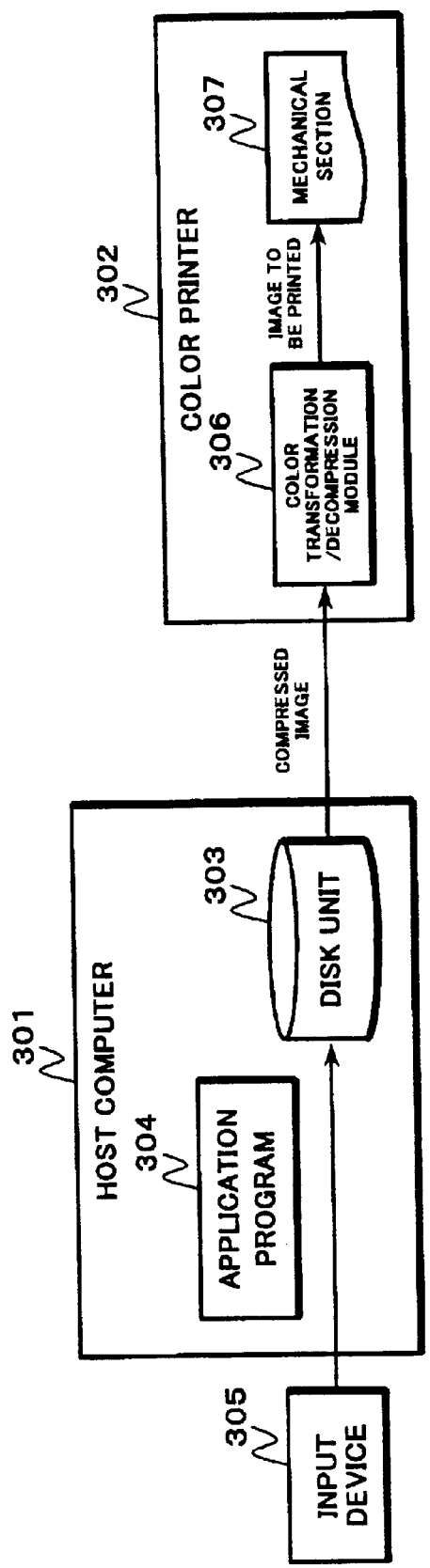
FIG. 8 is a block diagram showing an example of a main configuration of an image processing apparatus consistent with a second embodiment of the present invention.

FIG. 8 is a block diagram showing an example of a main configuration of an image processing apparatus consistent with a second embodiment of the present invention. In FIG. 8, a color printer system composed of a host computer 301 and a color printer 302 will be exemplified and explained. Host computer 301, which stores compressed images, has a disk unit 303 and an application program 304. The compressed image may be inputted from an input device 305, such as a scanner or digital camera, or may be generated by application program 304 and compressed according to JPEG standards, for example. This stored compressed image data is transferred to color printer 302 via a storage medium or a communication medium following a command from application program 304.

Color printer 302, includes of a color transformation/decompression module 306 and a mechanical section 307 and performs color transformation and decompression on the compressed image data supplied by color transformation/decompression module 306. Color printer 302 supplies the compressed image data to mechanical section 307 as image data to be printed, and mechanical section 307 outputs the data. Color transformation/decompression module 306 may be installed in host computer 301.

Figure 9:
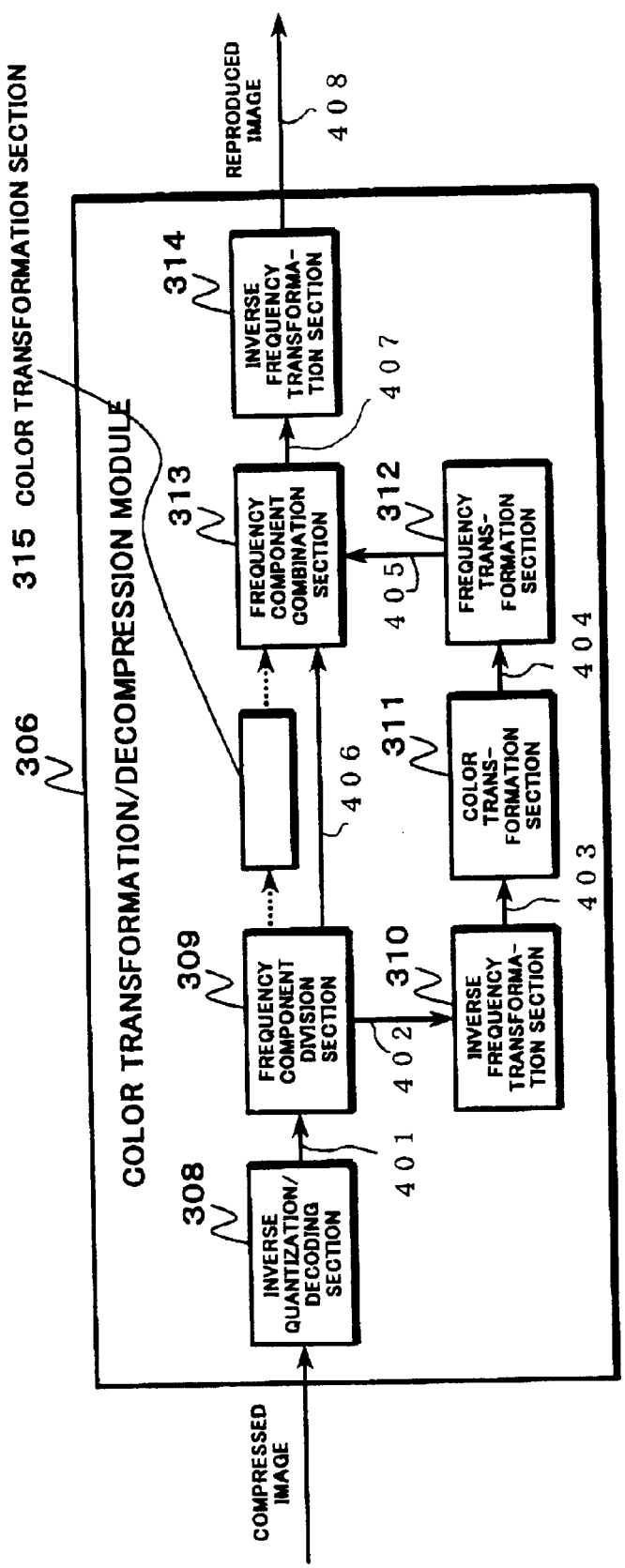
FIG. 9 is a block diagram showing an example of a main configuration of a color transformation/extension module of the image processing apparatus shown in FIG. 8.
Figure 10:
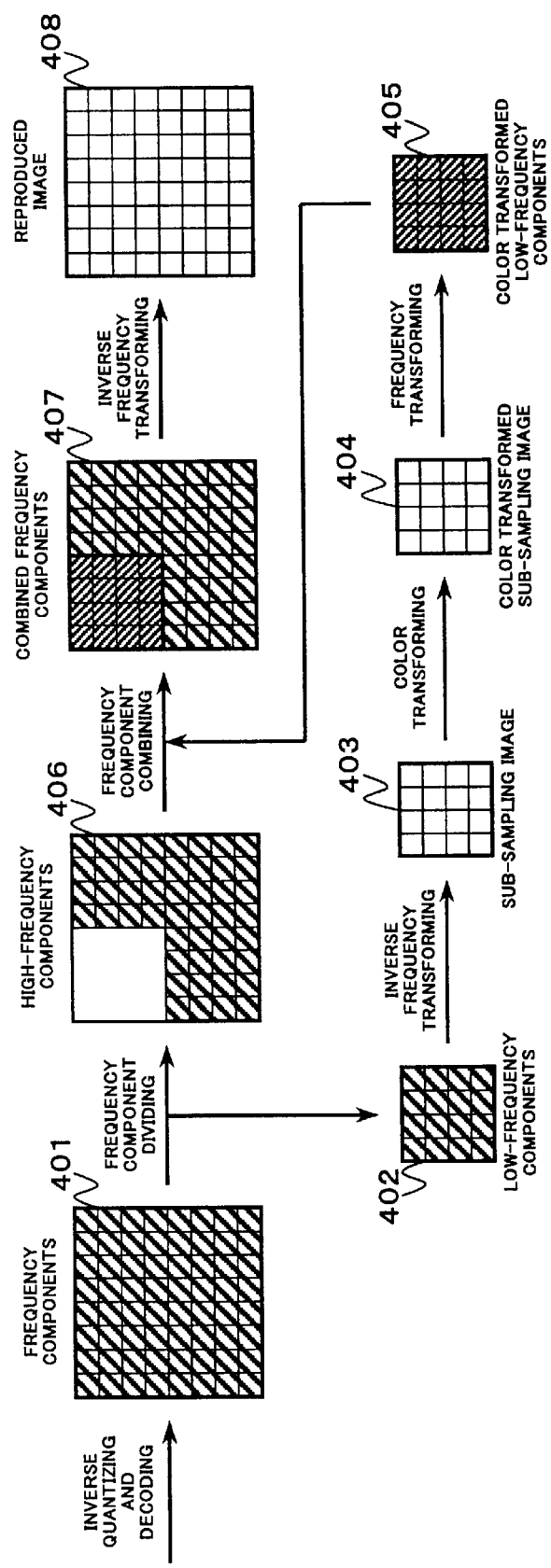
FIG. 10 is a diagram showing a procedure for executing the color transformation/extension by the module shown in FIG. 9.

Next, referring to FIGS. 9 and 10, the color transformation/decompression processing method will be explained. FIG. 9 is a block diagram showing an example of a configuration of a color transformation/decompression module 306 of the image processing apparatus shown in FIG. 8. FIG. 10 is a diagram showing a procedure for performing the color transformation/decompression by the module shown in FIG. 9.

Color transformation/decompression module 306 has an inverse quantization/decoding section 308, a frequency component division section 309, an inverse frequency transformation section 310, a color transformation section 311, a frequency transformation section 312, a frequency component combination section 313, and an inverse frequency transformation section 314. Color transformation/decompression module 306 performs inverse quantization and decoding on the compressed image data, divides it into high-frequency and low-frequency components, and then performs color transformation and decompression separately.

Inverse quantization/decoding section 308 performs variable length encoding and inverse quantization on the supplied compressed image data to obtain frequency components 401 composed of 8×8 bit pixel blocks. Processing between frequency component division section 309 and frequency component combination section 313 is similarly performed as to that between frequency component division section 109 and frequency component combination section 113 shown in FIGS. 6 and 7. Frequency component combination section 313 generates combined frequency components 407 and outputs them. Inverse frequency transformation section 314 executes the inverse frequency transformation on combined frequency component 407 to generate a reproduced image, and outputs the image to color printer 302.

In this embodiment, a special color transformation on high-frequency component 406 has not been performed. However, color transformation section 315 may be installed between frequency component division section 309 and frequency component combination section 313, and performs calculations on a smaller quantity compared with color transformation section 311 as the need arises.

According to this embodiment of the present invention, which takes into account human visional characteristics, the number of pixels in the input of the color transformation can be reduced because color transformation is performed only on the low-frequency components, with effects to image quality, after the original image is divided into the low-frequency and the high-frequency components by frequency transformation. Further, as a result, the LPF function and the sub-sampling function for the original image can be simultaneously realized. So it is possible to speed up the color transformation/decompression without spoiling the apparent image quality.

Besides, according to this embodiment, because sub-sampling by curtailing partial data is not performed, there is no need to perform expansion processing after color transformation. So, there is no need to determine the boundary position between the low-frequency and high-frequency components.

Figure 11:
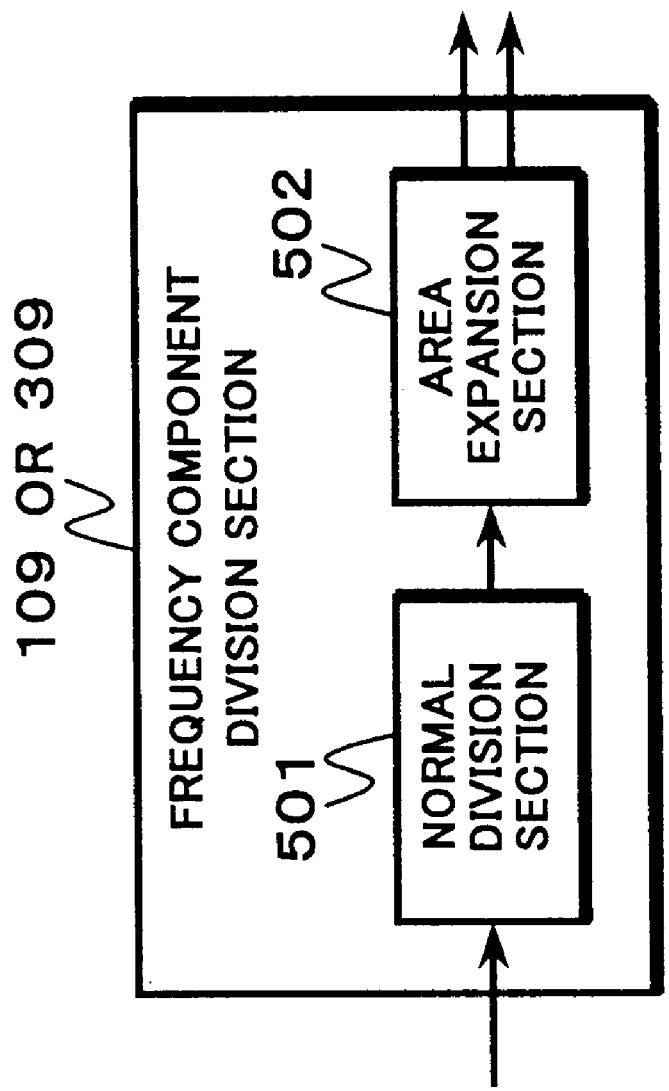
FIG. 11 is a block diagram showing a configuration of a frequency component division section shown in FIGS. 6 and 9.

Next, referring to FIGS. 11 through 12, a dynamic determination system of the frequency component division applied to the first and second embodiments will be explained. FIG. 11 is a diagram showing a procedure for performing the color transformation/decompression by the frequency component division section 109 or 309. The frequency component division section 109 or 309 has a normal division section 501 and an area expansion section 502.

FIG. 11 is a block diagram showing a configuration of the frequency component division section shown in FIGS. 6 and 9. FIGS. 12(*a*) and (*b*) are diagrams showing a procedure for dynamically dividing a frequency component composed of 8×8 bit pixel blocks according to a DCT technique in the frequency component division section shown in FIG. 11.

Omission of the color transformation of high-frequency components hardly influences image quality because of human visional characteristics, as mentioned before. However, there is a possibility of causing a color error, which influences image quality, if the area including the high-frequency components should be expanded. Therefore, by the following procedure, the frequency components area to be an input of color transformation is dynamically determined according to the image to be processed.

Figure 12:
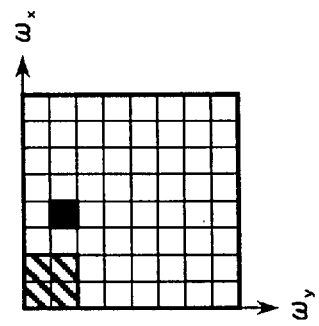
FIGS. 12(a) and (b) are diagrams showing a procedure for dynamically dividing frequency components according to a DCT in the frequency component division section shown in FIG. 11.
Figure 12:
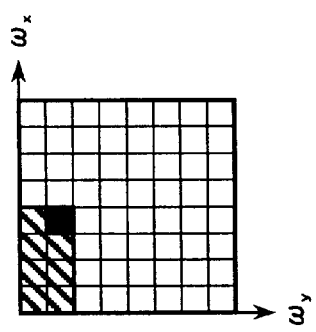

First, the normal division section 501 determines a hatched portion (2×2 bit pixel blocks) in FIG. 12(*a*), which is a predetermined area and includes the minimum frequency component, as a normal area of low-frequency components. If there are no large DCT coefficient values outside the hatched portion, namely, in an area of high-frequency components, the component division is normally performed. In this case, because the sampling rate of color transformation target image is vertically and horizontally 1:4 compared to the original image, the necessary calculation quantity becomes $\frac{1}{16}$ as compared to the original image.

If the DCT coefficient value of the block depicted in black in FIG. 12(*a*) is large, area expansion section 502 expands the hatched portion shown in FIG. 12(*a*) to include the black block as the area of low-frequency component, as shown in FIG. 12(*b*). In this case, because the sampling rate of color transformation target image is vertically 1:4 and horizontally 1:2 compared to the original image, the calculation quantity becomes $\frac{1}{8}$ as compared to the original image. That is, the area of low-frequency components selected in such a way that a block having a large DCT coefficient value will be included by a rectangle.

Since the method for determining if a DCT coefficient value is large, there may be a method for comparing the coefficient value of each component with a threshold value which is set in advance according to desired image quality or a processing speed, or a method for comparing the sum of coefficient values (or their square sum) in each rectangular area unit, composed of plural blocks including the minimum frequency component, with a threshold value. In the case of color image, because a 8×8 bit block of pixels exists for each color (RGB), there may another method for comparing a coefficient value of each component and the sum of coefficient values existing in the same position of each 8×8 bit pixel blocks with the threshold. It is also possible to reduce the color transformation target area from the normal area.

Figure 13:
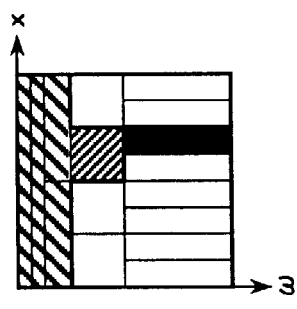
FIGS. 13(a) and (b) are diagrams showing a procedure for dynamically dividing frequency components according to a Wavelet transformation in the frequency component division section shown in FIG. 11.
Figure 13:
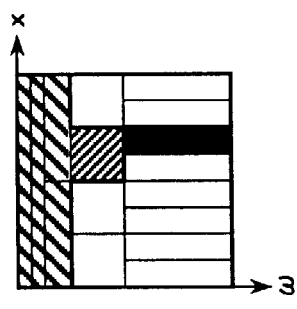

FIGS. 13(a) and (b) are diagrams showing a procedure for dynamically dividing a frequency component according to Wavelet transformation of the frequency components of one-dimensional 16 bit pixels division section shown in FIG. 11.

Similarly to the DCT technique, when a high-frequency component has a large Wavelet coefficient value, the color transformation target area is expanded. In the case of the Wavelet transformation, the fixed space division like the 8×8 bit block of pixels of the DCT is not performed because a component itself corresponds to a specific area in the space and the division can be performed more appropriate according to circumstances compared with the DCT.

There may be a case where the normal color transformation target area is composed of a block hatched with diagonal lines of '/' such as shown in FIG. 13(a) and a high-frequency component having a large Wavelet coefficient value exists at a block painted with black. In such a case, the hatched block is performed the same way as the low-frequency component, with color transformation at the sampling rate of 4:1. Besides, the block painted with black and a block hatched with diagonal lines of '\' in FIG. 13(b), which is positioned at more low-frequency side over the position of the block painted with black, are regarded as low-frequency components, and the other blocks are regarded as high-frequency components. Then they are executed with corresponding color transformation, respectively.

That is, if a high-frequency component having a large Wavelet coefficient value exists, the boundary is changed to include the space position, corresponding to the high-frequency component, as part of the color transformation target. As a result, color transformation of high accuracy for important parts can be achieved.

According to this embodiment of the present invention, because low-frequency components, which color transformation is performed, is dynamically determined depending on distribution of large coefficient values, it is possible to execute high quality image processing. Besides, depending on the threshold and the normal low-frequency component area, which are predetermined, processing according to desired image quality or improved processing speed can be realized.

The color transformation/compression and color translation/decompression shown in these embodiments can be realized in hardware or software. If performed in software, an operating system working on a computer, application software, such as database management software or network software, may perform part of the processing.

Besides, as a storage media to store the relevant software, magnetic disk, floppy disk, hard disk (e.g., DC-ROM, CD-R, DVD), magneto-optic disk (e.g., MO), or semiconductor memory may store the program as long as the storage medium can be read by a computer. The storage medium includes a storage medium storing or temporarily storing a downloaded program transmitted via a LAN, Internet, etc. as well as a medium independent of the computer. Besides, the storage medium is not necessarily limited to one but also a plurality of media.

What is claimed is:

1. An image processing apparatus, comprising:

first means for performing frequency transformation on image data to generate first frequency components;

means for dividing the first frequency components into low-frequency components and high-frequency components;

means for performing an inverse transformation of the frequency transformation on the low-frequency components;

means for performing color transformation on the low-frequency components that were transformed by the inverse transformation;

second means for performing on the low-frequency components that were transformed by the color transformation, a frequency transformation that is the same as the frequency transformation performed by the first means; and means for combining, to generate second frequency components, the high-frequency components and the low-frequency components that were transformed by the transformation of the second performing means.

2. The apparatus of claim 1, further comprising means for encoding the second frequency components.

3. The apparatus of claim 1, further comprising means for quantizing the second frequency components.

4. The apparatus of claim 1, wherein the frequency transformation includes a discrete cosine transformation.

5. The apparatus of claim 1, wherein the frequency transformation includes a Wavelet transformation.

6. The apparatus of claim 1, wherein the color transformation means performs color transformation between Red, Green and Blue and cyan, magenta and yellow.

7. The apparatus of claim 1, further comprising:

means for performing a second color transformation simpler than that performed by the first color transformation performing means; and wherein the combining means combines the high-frequency components that were transformed by a color transformation by the second color transformation performing means and the low-frequency components that were transformed by the transformation by the second performing means.

8. The apparatus of claim 1, wherein the dividing means comprises:

means for recognizing a first part of the first frequency components as low-frequency components, a second part which is composed of predetermined frequency components including the lowest-frequency component, and a third part as the high-frequency components.

9. The apparatus of claim 8, wherein the dividing means further comprises:

means for expanding the second part to include a frequency component in the high-frequency components, wherein the frequency component has a value larger than a predetermined value.

10. An image processing apparatus, comprising means for dividing first frequency components into low-frequency components and high-frequency components;

first means for performing an inverse frequency transformation on the low-frequency components;

means for performing a color transformation on the low-frequency components that were transformed by the inverse frequency transformation;

means for performing on the low-frequency components that were transformed by the color transformation a normal transformation of the inverse frequency transformation;

means for combining, to generate second frequency components, the high-frequency components and the low-frequency components that were transformed by the normal transformation; and second means for performing an inverse transformation that is the same as the inverse transformation performed by the first means.

11. The apparatus of claim 10, further comprising means for decoding encoded image data to generate the first frequency components.

12. The apparatus of claim 10, further comprising means for inverse quantizing quantized image data to generate the second frequency components.

13. The apparatus of claim 10, wherein the frequency transformation includes a discrete cosine transformation.

14. The apparatus of claim 10, wherein the frequency transformation includes a Wavelet transformation.

15. The apparatus of claim 10, wherein the color transformation means executes color transformation between Red, Green and Blue and cyan, magenta and yellow.

16. The apparatus of claim 10, further comprising:

means for performing color transformation simpler than that performed by the first color transformation performing means; and wherein the combining means combines the high-frequency components that were transformed by a color transformation by the second color transformation performing means and the low-frequency components that were transformed by the transformation by the second performing means.

17. The apparatus of claim 10, wherein the dividing means comprises:

means for recognizing a first part of the first frequency components as low-frequency components, a second part which is composed of predetermined frequency components including the lowest-frequency component, and a third part as the high-frequency components.

18. The apparatus of claim 17, wherein the dividing means further comprises:

means for expanding the second part to include a frequency component in the high-frequency components, wherein the frequency component has a value larger than a predetermined value.

19. An image processing method, comprising:

performing a first frequency transformation to image data to generate first frequency components;

dividing the first frequency components into low-frequency components and high-frequency components;

performing an inverse transformation of the frequency transformation on the low-frequency components;

performing a color transformation on the low-frequency components executed with the inverse transformation;

performing a second frequency transformation that is the same as the first frequency transformation on the low-frequency components that were transformed by the color transformation; and combining to generate second frequency components the high-frequency components and the low-frequency components that were transformed by the second frequency transformation.

20. The method of claim 19, further comprising:

recognizing part of the first frequency components as low-frequency components, a part which is composed of predetermined frequency components including the lowest-frequency component, and others as the high-frequency components.

21. The method of claim 20, further comprising:

expanding the part to include a frequency component in the high-frequency components, wherein the frequency component has a value larger than a predetermined value.

22. An image processing method, comprising:

dividing first frequency components into low-frequency components and high-frequency components;

performing a first inverse frequency transformation on the low-frequency components;

performing a color transformation on the low-frequency components that were transformed by the inverse frequency transformation;

performing a normal transformation of the inverse frequency transformation on the low-frequency components that were transformed by the color transformation;

combining to generate second frequency components the high-frequency components and the low-frequency components that were transformed by the normal transformation; and performing a second inverse frequency transformation that is the same as the first inverse transformation.

23. The method of claim 22, further comprising:

recognizing part of the first frequency components as low-frequency components, a part which is composed of predetermined frequency components including the lowest-frequency component, and others as the high-frequency components.

24. The method of claim 23, further comprising:

expanding the part to include a frequency component in the high-frequency components, wherein the frequency component has a value larger than a predetermined value.

25. A computer-readable medium containing instructions for controlling a data processing system to perform a method for producing a document having a link to a link destination via a network, the method comprising the steps of:

performing a first frequency transformation to image data to generate first frequency components;

dividing the first frequency components into low-frequency components and high-frequency components;

performing an inverse transformation of the frequency transformation on the low-frequency components;

performing a color transformation on the low-frequency components that were transformed by the inverse transformation;

performing a second frequency transformation that is the same as the first frequency transformation on the low-frequency components that were transformed by the color transformation; and combining to generate second frequency components the high-frequency components and the low-frequency components that were transformed by the second frequency transformation.

26. A computer-readable medium containing instructions for controlling a data processing system to perform a method for producing a document having a link to a link destination via a network, the method comprising the steps of:

dividing first frequency components into low-frequency components and high-frequency components;

performing a first inverse frequency transformation on the low-frequency components;

performing a color transformation on the low-frequency components that were transformed by the inverse frequency transformation;

performing a normal transformation of the inverse frequency transformation on the low-frequency components that were transformed by the color transformation;

combining to generate second frequency components the high-frequency components and the low-frequency components that were transformed by the normal transformation; and performing a second inverse frequency transformation that is the same as the first inverse frequency transformation.

* * * * *